US 11,255,179 B2

(12) United States Patent
Sobhana

(10) Patent No.: US 11,255,179 B2
(45) Date of Patent: Feb. 22, 2022

(54) ACCELEROMETER SYSTEMS AND METHODS FOR ROTATING DOWNHOLE TOOLS

(71) Applicant: Halliburton Energy Services, Inc., Houston, TX (US)

(72) Inventor: Rashobh Rajan Sobhana, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/651,575

(22) PCT Filed: Nov. 29, 2018

(86) PCT No.: PCT/US2018/063078
§ 371 (c)(1),
(2) Date: Mar. 27, 2020

(87) PCT Pub. No.: WO2019/118188
PCT Pub. Date: Jun. 20, 2019

(65) Prior Publication Data
US 2020/0300076 A1    Sep. 24, 2020

Related U.S. Application Data

(60) Provisional application No. 62/598,946, filed on Dec. 14, 2017.

(51) Int. Cl.
*E21B 41/00* (2006.01)
*E21B 44/00* (2006.01)
(Continued)

(52) U.S. Cl.
CPC .............. *E21B 44/00* (2013.01); *E21B 41/00* (2013.01); *E21B 47/022* (2013.01); *G01P 15/08* (2013.01);
(Continued)

(58) Field of Classification Search
CPC ........ E21B 47/022; E21B 41/00; E21B 44/00; E21B 47/024; E21B 47/0905;
(Continued)

(56) References Cited

U.S. PATENT DOCUMENTS 2,968,957 A    1/1961   Condie et al.
4,958,125 A *  9/1990   Jardine ................... E21B 12/02
                                                    324/162

(Continued)

FOREIGN PATENT DOCUMENTS

CA    2121380    10/1994
EP    0377235    2/1992

(Continued)

OTHER PUBLICATIONS

ISRWO International Search Report and Written Opinion for PCT/US2018/063078 dated Mar. 15, 2019.

(Continued)

*Primary Examiner* — Daniel P Stephenson
(74) *Attorney, Agent, or Firm* — Benjamin Ford; C. Turney Law Group PLLC

(57) ABSTRACT

A method may comprise obtaining, during drilling operations within a wellbore, two-dimensional accelerometer data with an accelerometer on a rotating downhole tool, determining a radial offset of the accelerometer based on the two-dimensional accelerometer data, and determining a centripetal acceleration of the accelerometer based on the two-dimensional accelerometer data. A system may comprise one or more x-axis accelerometers disposed on a bottom hole assembly, one or more y-axis accelerometers disposed on the bottom hole assembly, an analog to digital converter, wherein the analog to digital converter converts (Continued)

an analog signal from the one or more x-axis accelerometers and the one or more y-axis accelerometers to a digital signal, and a computing subsystem.

20 Claims, 12 Drawing Sheets

(51) Int. Cl.
*E21B 47/022* (2012.01)
*G01P 15/08* (2006.01)
*G01P 15/18* (2013.01)

(52) U.S. Cl.
CPC ...... *G01P 15/18* (2013.01); *G01P 2015/0865* (2013.01)

(58) Field of Classification Search
CPC ........ E21B 47/092; G01P 15/18; G01P 21/00; G01P 15/08; G01P 2015/0865; G01V 11/00; G01V 13/00; G01V 3/26; G01V 3/40; G01V 7/00; G01V 7/005; G01V 7/04
See application file for complete search history.

(56) References Cited

U.S. PATENT DOCUMENTS

| | | | |
|---|---|---|---|
| 6,065,219 A * | 5/2000 | Murphey | E21B 47/085 33/544 |
| 7,860,676 B2 | 12/2010 | Sheng et al. | |
| 7,966,146 B2 | 6/2011 | Shkolnikov | |
| 9,567,855 B1 | 2/2017 | Kundel | |
| 9,568,321 B2 | 2/2017 | Bharadwaj et al. | |
| 10,865,634 B2 * | 12/2020 | Sobhana | E21B 47/09 |
| 2003/0183423 A1 | 10/2003 | Brazil et al. | |
| 2007/0107937 A1 | 5/2007 | Sugiura | |
| 2007/0289373 A1 * | 12/2007 | Sugiura | E21B 7/062 73/152.46 |
| 2009/0281756 A1 | 11/2009 | Weed et al. | |
| 2011/0184645 A1 | 7/2011 | Chansarkar | |
| 2014/0129148 A1 | 5/2014 | Harmer et al. | |
| 2015/0330210 A1 | 11/2015 | Lozinsky | |
| 2015/0331138 A1 | 11/2015 | Estes et al. | |
| 2020/0300076 A1 * | 9/2020 | Sobhana | G01P 15/18 |

FOREIGN PATENT DOCUMENTS

| | | |
|---|---|---|
| KR | 101118358 | 2/2012 |
| WO | 2014105025 | 7/2014 |

OTHER PUBLICATIONS

Park, S., & Hong, S. K. (2011). Angular Rate Estimation Using a Distributed Set of Accelerometers. Sensors, 11(11), 10444-10457.
Cardou, P., Fournier, G., & Gagnon, P. (2011). A Nonlinear Program for Angular-Velocity Estimation From Centripetal-Acceleration Measurements. IEEE/ASME Transactions on Mechatronics, 16(5), 932-944.
Kionix, Using Two Tri-Axis Accelerometers for Rotational Measurements, Jul. 2015.
Remus Avram, et al., Quadrotor Accelerometer and Gyroscope Sensor Fault Diagnosis Using Nonlinear Adaptive Estimation Methods (Int. J. Prognostics and Health Mgt., 2016).
Johnson, E. A., Bamberg, S. J. M., & Minor, M. A. (2008). A state estimator for rejecting noise and tracking bias in inertial sensors. 2008 IEEE International Conference on Robotics and Automation.
Batista, P., Silvestre, C., Oliveira, P., & Cardeira, B. (2011). Accelerometer Calibration and Dynamic Bias and Gravity Estimation: Analysis, Design, and Experimental Evaluation. IEEE Transactions on Control Systems Technology, 19(5), 1128-1137.
Tereshkov, V. M. (2013). An Intuitive Approach to Inertial Sensor Bias Estimation. International Journal of Navigation and Observation, 2013, 1-6.
Ruizenaar, TNO Technical Sciences, Driftless, an innovative method to estimate and compensate for the biases of inertial sensors (Proc. ENC-GNSS 2014).

* cited by examiner

ACCELEROMETER SYSTEMS AND METHODS FOR ROTATING DOWNHOLE TOOLS

TECHNICAL FIELD

The present description relates in general to rotating downhole tools in a wellbore, and more particularly to, for example, without limitation, accelerometer systems and methods for rotating downhole tools.

BACKGROUND

In directional drilling, accelerometers and other sensors are often provided in a rotating downhole tool for use in estimation of wellbore directional parameters such as inclination, gravity tool-face, and azimuth. However, manufacturing, assembly, and temporal variations associated with accelerometers can cause undesirable estimation errors.

The description provided in the background section should not be assumed to be prior art merely because it is mentioned in or associated with the background section. The background section may include information that describes one or more aspects of the subject technology.

Figure 1A:
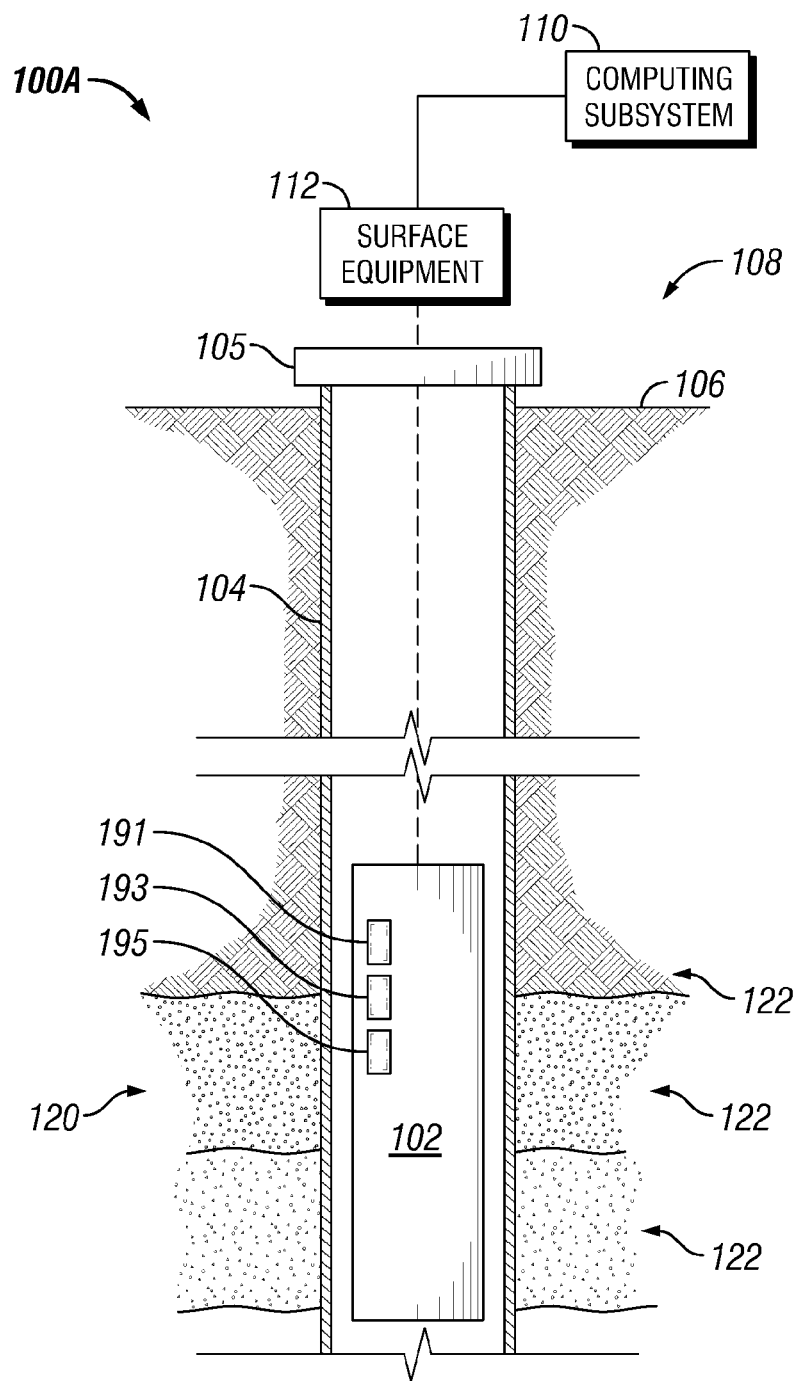
FIG. 1A is a diagram of an example well system, in accordance with aspects of the subject disclosure.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

In directional drilling, gravity sensors or accelerometers may be employed in various directional modules (DM) in order to obtain wellbore directional parameters such as inclination, gravity tool-face, and azimuth.

In accordance with various aspects of the disclosure, systems and methods may be provided for improving measurements of wellbore directional parameters by (1) estimating radial offsets and centripetal acceleration of the accelerometer, and (2) estimating accelerometer bias.

As discussed below, estimating radial offsets and centripetal acceleration of the accelerometer may employ a set of three accelerometers, two for radial components, and one for the axial component of gravitational acceleration. While some tools use axial DM sondes, some others rely on off-centered DM inserts. Regardless of the configuration, a directional unit may be expected to provide accurate measurements.

For an insert-based design, the accelerometers may be disposed at a radial offset from the tool axis. For a sonde-based design, it is practically challenging to align accelerometers exactly to the center axis due to various reasons, e.g., mounting tolerances, chip misalignment etc. FIG. 1C, described in further detail below shows accelerometers mounted at a radial distance r from the tool center axis. In examples, when only acceleration due to gravity, g, is present, an inclination θ may be written as, $$g_x(t) = -g'(t)\cos \alpha(t) \quad (1)$$

$$g_y(t) = g'(t)\sin \alpha(t) \quad (2)$$

where $g_x$ and $g_y$ are the output of X and Y accelerometers, respectively, $g'(t) = g \sin \theta(t)$ and a is the gravitational tool-face. While drilling downhole, other factors such as vibrations, rotational effects, etc. may be taken into account and the above equations may be modified accordingly as discussed in further detail hereinafter.

While rotating with a uniform speed, the X-axis accelerometer experiences, in addition to acceleration due to gravity, a centripetal acceleration that acts radially towards the center. This acceleration component is directly proportional to the radial offset r and mathematically expressed as $$a_c(t) = r\omega(t)^2 \text{ ms}^{-2}$$

where ω is the angular velocity. The angular velocity is defined as $$\omega = \frac{d\alpha'}{dt},$$

a' is the instantaneous angular displacement. It may be noted that a tangential acceleration $$a_t = r\frac{d\omega}{dt}$$

acts on the Y-axis if the rotational speed varies. For modest RPM variations, this component is not significant and may be neglected.

If not adequately compensated for, the centripetal acceleration may introduce error in measurements. As r increases, the output $g_x$ shifts farther from an ideal zero-mean waveform. This error may be reflected in attitude measurements using the accelerometer data. It may be noted that this error may be significantly large especially for higher RPMs and larger offsets. For example, toolface $$\alpha = \tan^{-1}\left(\frac{g_Y}{-g_X}\right),$$

may have an error that is translated from a centripetal acceleration effect. In order to avoid such errors, centripetal acceleration is estimated and X-axis accelerometer data $g_x$ is corrected.

In order to compute centripetal acceleration using equation (2) above, it is desirable to determine both r and co. For large r values, physical measurement with some degree of accuracy may be feasible. However, for very small offsets, direct measurement is challenging. One possible technique to estimate the offset is to rotate the calibrated directional module at a uniform known RPM and compute the dc bias (mean). For a calibrated (bias corrected) accelerometer, the measured bias is the estimated centripetal acceleration $a_c$. Knowing the RPM, r may be estimated as:

$$\hat{r} = \frac{-\hat{a}_c}{(30\pi\ RPM)^2} \qquad (4)$$

This method necessitates the knowledge of RPM and accurate computation of the signal bias. Hence, the DM may be occupied with a gyroscope or any other sensors that may measure RPM. A gyroscope may not be an integrated part of some DMs which rely on magnetometers for measuring RPM. In addition, gyroscope output is sensitive to bias changes, sensitivity variations, etc. In examples, RPM measurement using a magnetometer may not be reliable in scenarios where magnetic field interferences are present. Moreover, for inclinations greater than zero, estimation of $a_c$ may be carefully done using multiples of full cycles of data in order to avoid bias error. Although this seems to be a simple solution, in practice, it is not. In a realistic environment where data may be noisy, accurately obtaining signal bias may be difficult. A small error in bias measurement may be translated into larger error in offset estimation, in particular, for small offsets.

In accordance with various aspects, the systems and methods disclosed herein do not require RPM information for estimating r and co. The disclosed systems and methods require only X and Y-axis accelerometer data to achieve offset error compensation.

In accordance with various aspects of the subject disclosure, systems and methods may estimate an X-axis accelerometer's radial offset and centripetal acceleration using only X and Y-axis accelerometer data. Subtracting estimated centripetal acceleration from the measured X-axis accelerometer signal leaves only the gravitational acceleration component. The disclosed systems and methods employ an extended Kalman filter in order to estimate the radial offset as well as instantaneous angular displacement of the sensor using which the centripetal acceleration is determined.

Some techniques assume or approximate radial offset from the electrical/mechanical design parameters. For sonde-based designs, it is a common practice to neglect small offsets. As mentioned earlier, at higher RPMs, the error introduced may be significantly large even for such small offsets. It is noted that centripetal acceleration effect may not fully alleviated in case of offset mismatches. Some other techniques depend on multiple sets of accelerometers with known radial offsets for mitigating rotational acceleration effects. This not only adds to the total cost and complexity, but also requires accurate placement of sensors.

As opposed to the method using a gyroscope and accelerometers, the disclosed systems and methods described herein employ only a single pair of accelerometers, one for X axis and other for Y axis, in order to estimate centripetal acceleration. The disclosed systems and methods described herein may estimate both r and $a_c$ on-the-fly, thereby avoiding any pre-calibration for radial offset errors.

Some inclination measurement algorithms generally use X, Y, and Z-axis accelerometers for computing tool inclination. In the disclosed systems and methods, the Kalman filter also estimates $g'(t)=g \sin \theta(t)$ from which an inclination $\theta$ may be obtained. In this way, inclination may be determined using only radial gravity components (i.e., without using a Z-axis accelerometer). In some cases, for $\theta>90°$, a quadrant correction may be applied since an arcsine ($-90°-90°$) function is used to compute the inclination.

Mitigation of centripetal acceleration improves the accuracy of a directional module. As pointed out earlier, it may not be easy to directly measure r for near-axis sensors. Even for a small r, the attitude measurement error may be considerably large, particularly for higher RPMs. The disclosed systems and methods effectively estimate the centripetal acceleration from sensor data without using any a-priori information. In this way, the disclosed system and methods are also be able to estimate inclination from axial gravity components.

In accordance with various aspects, removing the effect of centripetal acceleration may increase the accuracy in estimating toolface, inclination, and azimuth. This in turn helps to achieve better position control while drilling thereby increasing drilling efficiency.

FIG. 1A is a diagram of an example well system 100a. Well system 100a includes measurement system 108 and a subterranean region 120 beneath the ground surface 106. A well system may include additional or different features that may not be shown in FIG. 1A. For example, well system 100a may include additional drilling system components, wireline measurement system components, etc.

Subterranean region 120 may include all or part of one or more subterranean formations or zones. The example subterranean region 120 shown in FIG. 1A includes multiple subsurface layers 122 and a wellbore 104 penetrated through subsurface layers 122. Subsurface layers 122 may include sedimentary layers, rock layers, sand layers, or combinations of these and other types of subsurface layers. One or more of the subsurface layers may contain fluids, such as brine, oil, gas, etc. Although the example wellbore 104 shown in FIG. 1A is a vertical wellbore, measurement system 108 may be implemented in other wellbore orientations. For example, measurement system 108 may be adapted for horizontal wellbores, slanted wellbores, curved wellbores, vertical wellbores, or combinations of these.

The example measurement system 108 includes a measurement tool 102, surface equipment 112, and a computing subsystem 110. In the example shown in FIG. 1A, measurement tool 102 may be a downhole measurement tool that operates while disposed in wellbore 104. The example surface equipment 112 shown in FIG. 1A operates at or above ground surface 106, for example, near well head 105, to control measurement tool 102 and possibly other downhole equipment or other components of well system 100. The example computing subsystem 110 may receive and analyze measurement data from measurement tool 102. A measurement system may include additional or different features, and the features of a measurement system may be arranged and operated as represented in FIG. 1A or in another manner. In some instances, all or part of computing subsystem 110 may be implemented as a component of, or can be integrated with one or more components of, surface equipment 112, measurement tool 102 or both. In some cases, computing subsystem 110 may be implemented as one or more computing structures separate from surface equipment 112 and measurement tool 102.

In some implementations, computing subsystem 110 may be embedded in measurement tool 102, and computing subsystem 110 and measurement tool 102 may operate concurrently while disposed in wellbore 104. For example, although computing subsystem 110 is shown above ground surface 106 in the example shown in FIG. 1A, all or part of computing subsystem 110 may reside below ground surface 106, for example, at or near the location of the measurement tool 102.

Well system 100a can include communication or telemetry equipment that allows communication among computing subsystem 110, measurement tool 102, and other components of measurement system 108. For example, the components of measurement system 108 may each include one or more transceivers or similar apparatus for wired or wireless data communication among the various components. For example, measurement system 108 may include systems and apparatus for optical telemetry, wireline telemetry, wired pipe telemetry, mud pulse telemetry, acoustic telemetry, electromagnetic telemetry, or a combination of these and other types of telemetry. In some cases, measurement tool 102 receives commands, status signals, or other types of information from computing subsystem 110 or another source. In some cases, computing subsystem 110 receives measurement data, status signals, or other types of information from the measurement tool 102 or another source.

Measurement operations may be performed in connection with various types of downhole operations at various stages in the lifetime of a well system. Structural attributes and components of surface equipment 112 and measurement tool 102 may be adapted for various types of measurement operations. For example, measurement may be performed during drilling operations, during wireline measurement operations, or in other contexts. As such, surface equipment 112 and measurement tool 102 may include, or may operate in connection with drilling equipment, wireline measurement equipment, or other equipment for other types of operations.

Figure 1B:
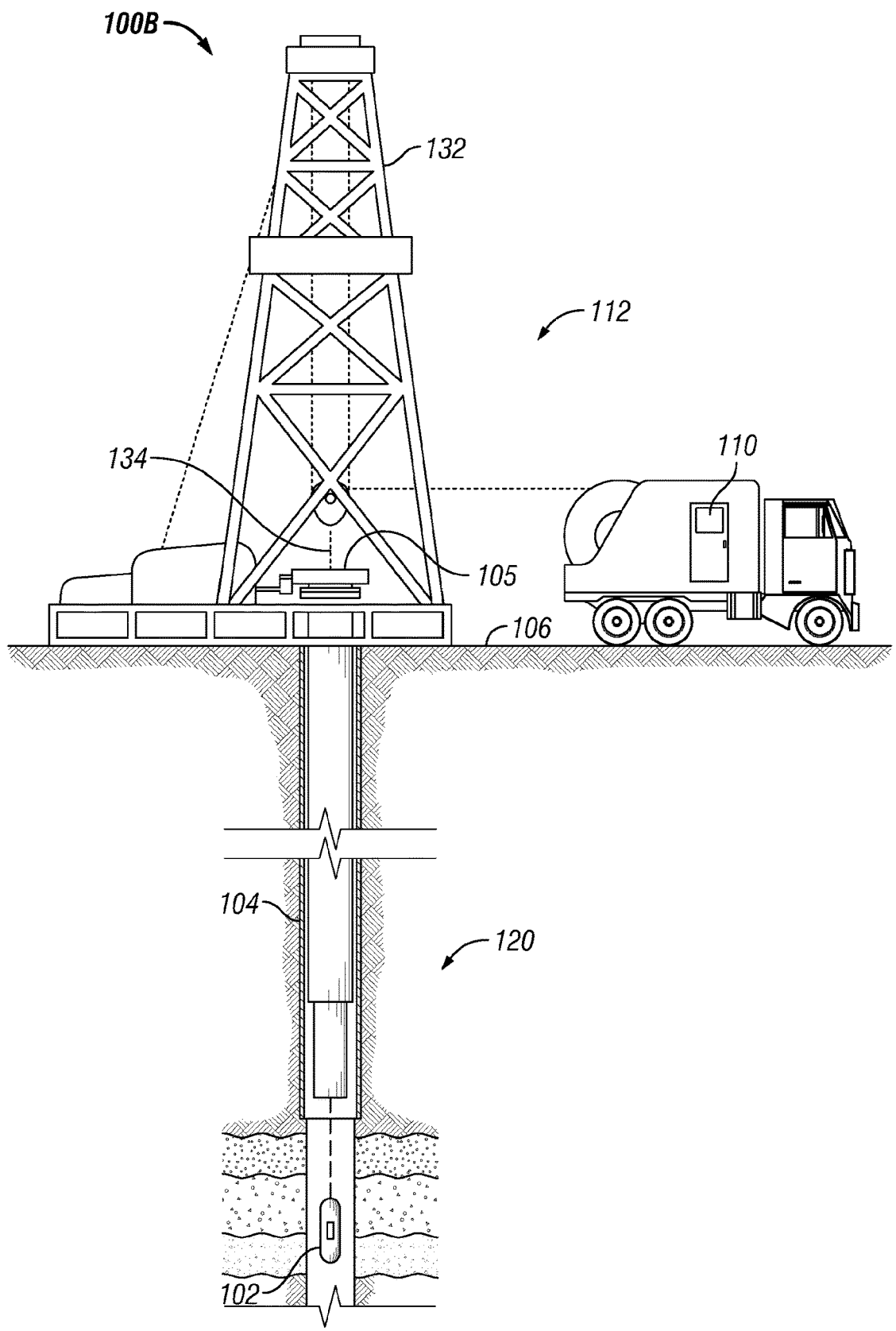
FIG. 1B is a diagram of an example well system that includes a measurement tool in a wireline measurement environment, in accordance with aspects of the subject disclosure.
Figure 1C:
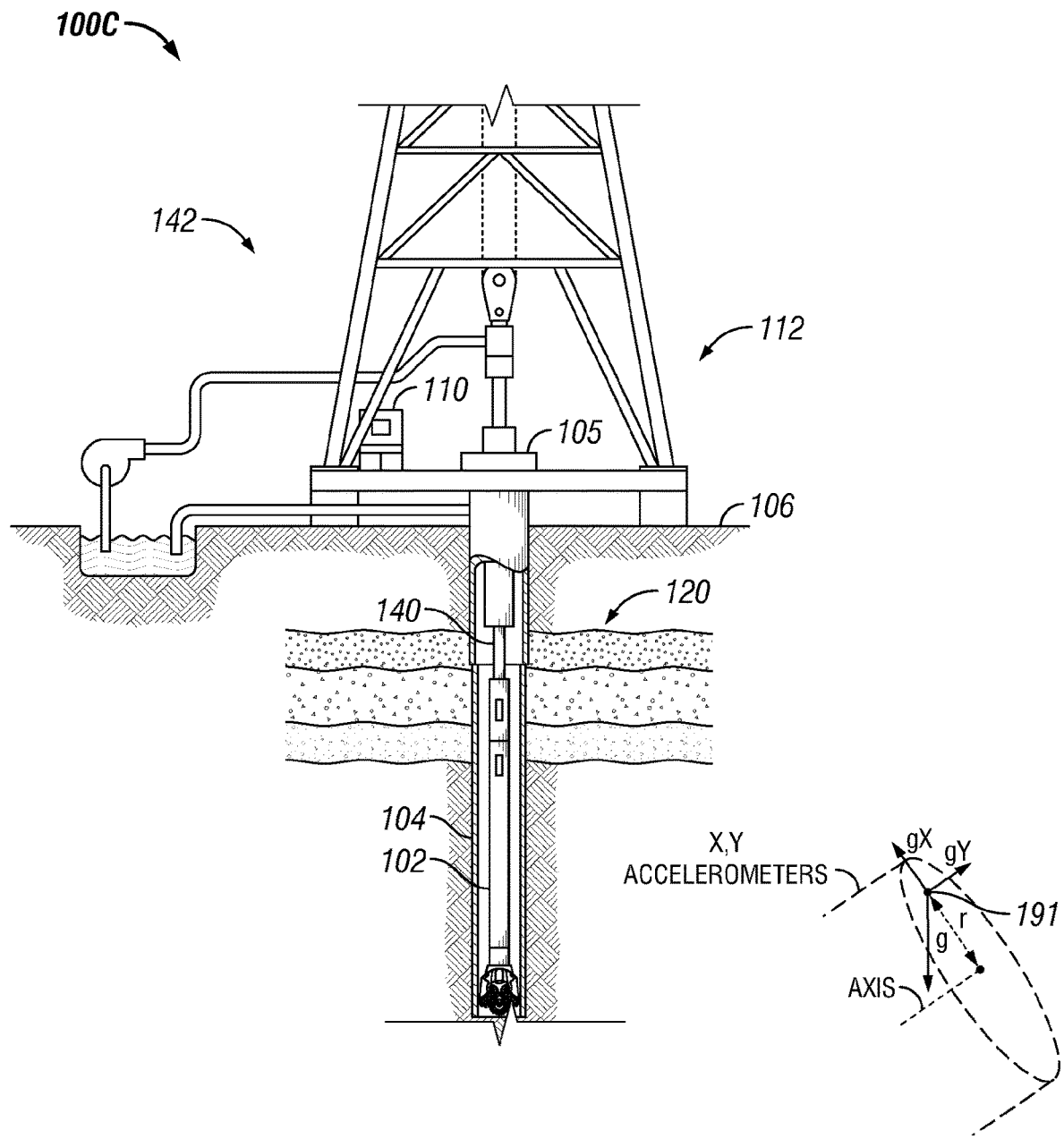
FIG. 1C is a diagram of an example well system that includes a measurement tool in a measurement while drilling (MWD) environment, in accordance with aspects of the subject disclosure.

In some examples, measurement operations may be performed during wireline measurement operations. FIG. 1B shows an example well system 100b that includes measurement tool 102 in a wireline measurement environment. In some example wireline measurement operations, surface equipment 112 includes a platform above ground surface 106 equipped with a derrick 132 that supports a wireline cable 134 that extends into wellbore 104. Wireline measurement operations may be performed, for example, after a drill string is removed from wellbore 104, to allow wireline measurement tool 102 to be lowered by wireline or measurement cable into wellbore 104.

In some examples, measurement operations may be performed during drilling operations. FIG. 1C shows an example well system 100c that includes measurement tool 102 in a measurement while drilling (MWD) environment. Drilling is commonly carried out using a string of drill pipes connected together to form a drill string 140 that is lowered through a rotary table into wellbore 104. In some cases, a drilling rig 142 at ground surface 106 supports drill string 140, as drill string 140 may operate to drill a wellbore 140 penetrating subterranean region 120. Drill string 140 may include, for example, a kelly, drill pipe, a bottomhole assembly, and other components. The bottomhole assembly on the drill string may include drill collars, drill bits, measurement tool 102, and other components. The measurement tools may include measuring while drilling (MWD) tools, logging while drilling (LWD) tools, and others. In examples, measurement tool 102 includes one or more accelerometers 191, magnetometers 193, angular sensors 195, and/or other sensors. FIG. 1C also shows an example of an offset accelerometer 191 as described above.

A determination of an accelerometer radial offset and centripetal acceleration for one or more accelerometers 191, using only X and Y-axis accelerometers in measurement tool 102, may be determined during a drilling operation, using the derivation provided as follows.

In a realistic scenario, Eq. (1) may be modified as $$g_{X'}(t) = -g'(t)\cos \alpha(t) - a_c(t) + n_X(t) \quad (5)$$

$$g_{Y'}(t) = g'(t)\sin \alpha(t) + a_t(t) + n_Y(t) \quad (6)$$

where $n_X$ and $n_Y$ are the random noises corresponding to X and Y accelerometers, respectively. These noises may be modeled as a zero-mean random process with a normal distribution. As pointed out earlier, $a_t(t)$ may be neglected in Eq. (5) unless frequent drastic changes in RPM are expected. Hence, Eq. (5) becomes:

$$g_{X'}(t) = -g'(t)\cos \alpha(t) - a_c(t) + n_X(t) \quad (7)$$

$$g_{Y'}(t) = g'(t)\sin \alpha(t) + n_Y(t) \quad (8)$$

Figure 2:
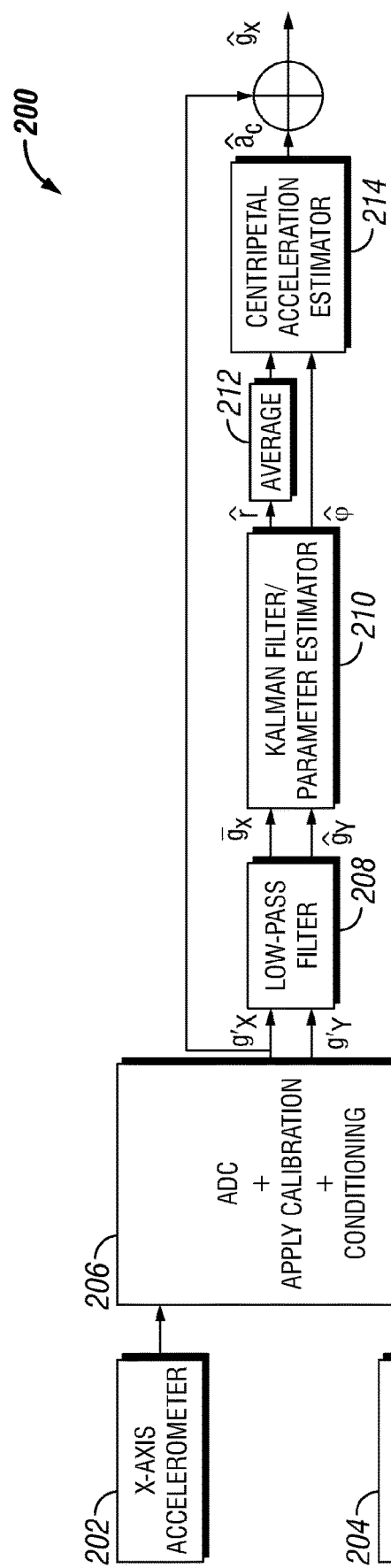
FIG. 2 is a block diagram illustrating a process that may be performed for estimating a radial offset and centripetal acceleration of an accelerometer in a rotating downhole tool, in accordance with aspects of the subject disclosure.
Figure 3:
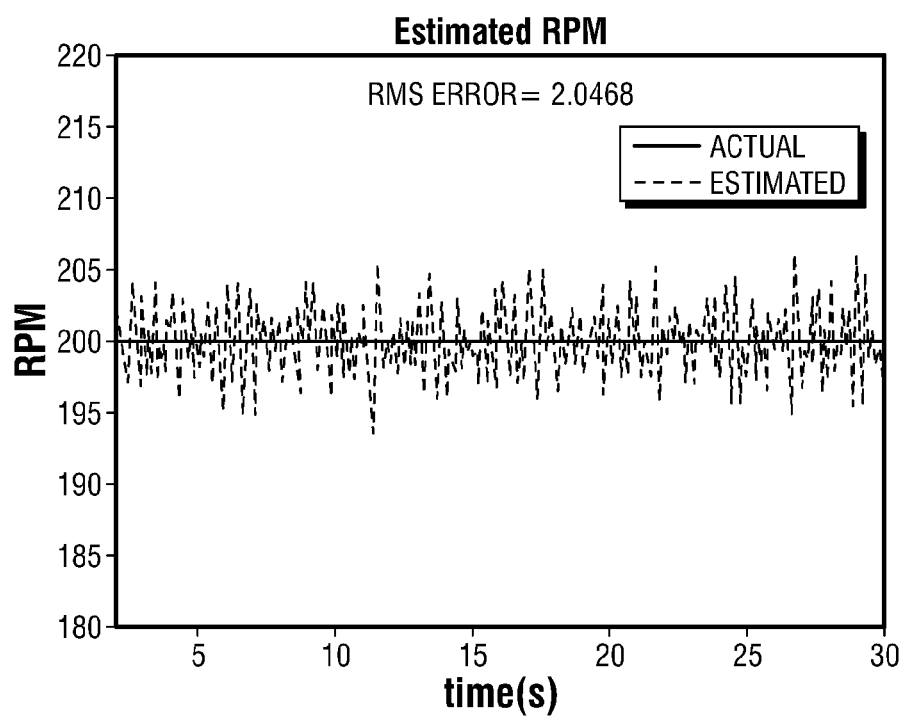
FIGS. 3-6 are graphs illustrating an example of removing noise from accelerometer data.
Figure 4:
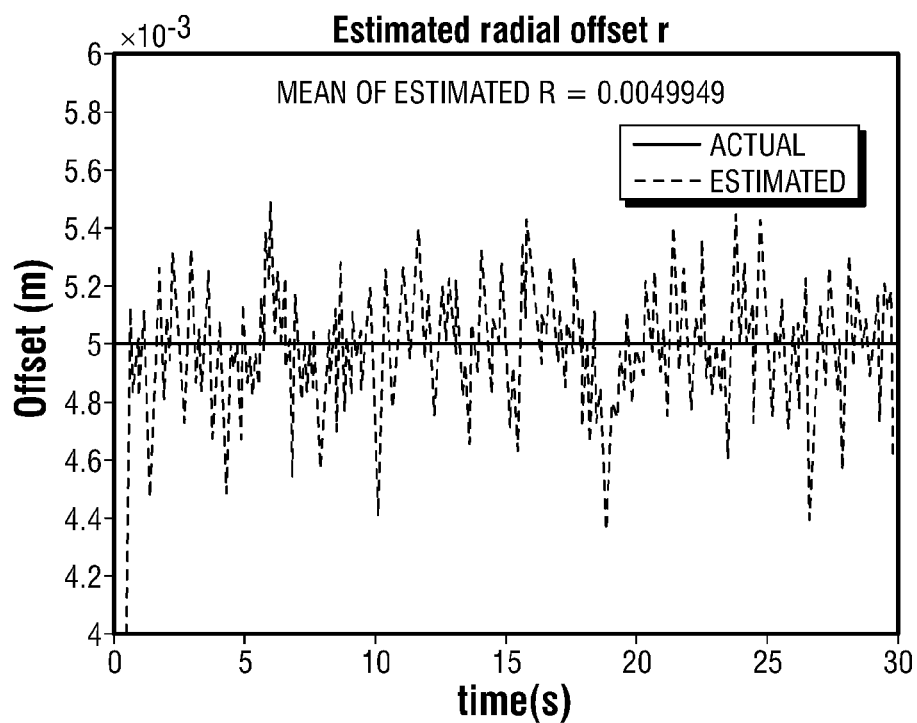
Figure 5:
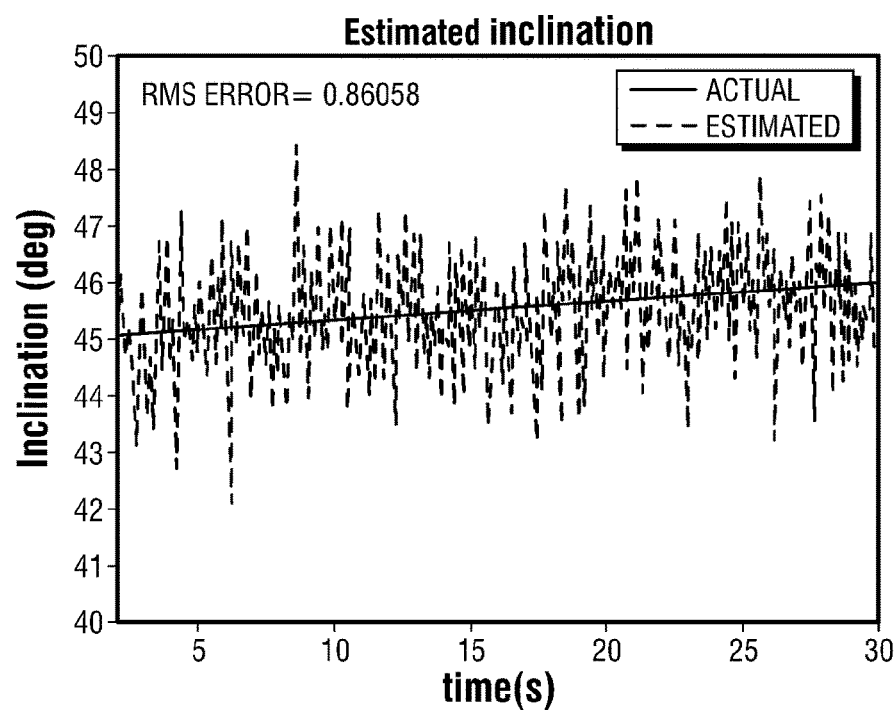
Figure 6:
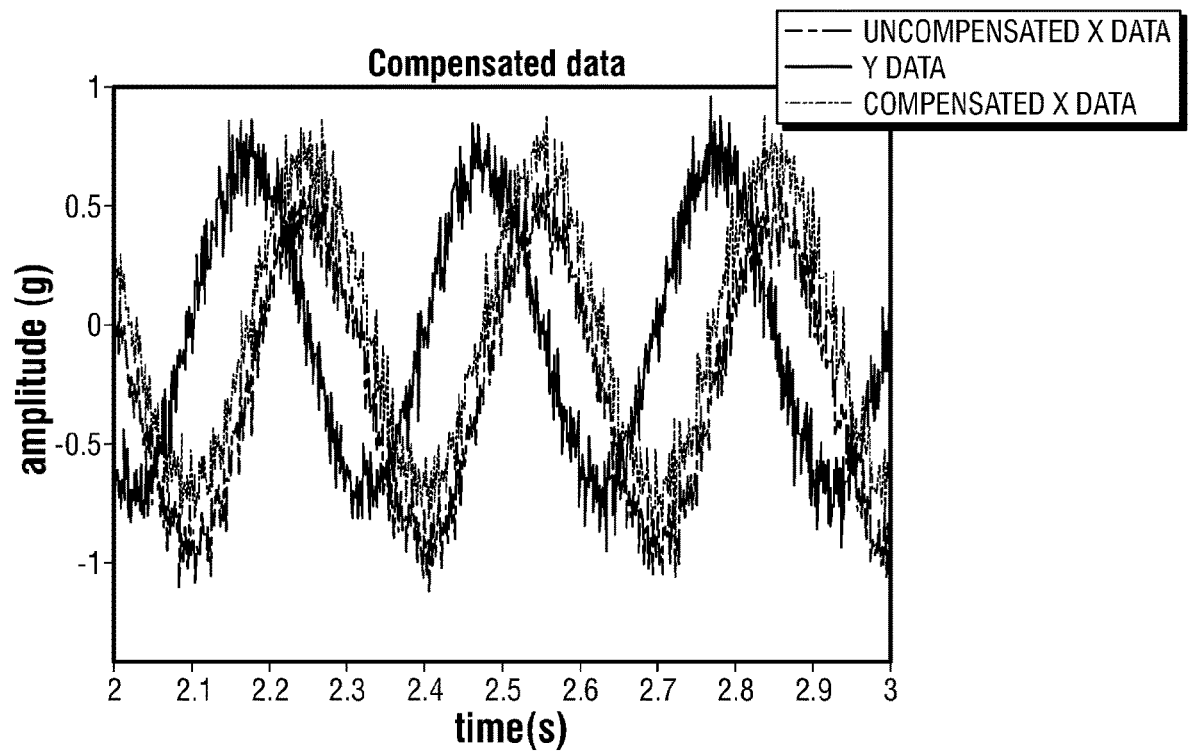

The above equations provide a basis for estimating the unknown parameters. The block diagram 200 given in FIG. 2 depicts the entire process. For example, raw analog signals one or more x-axis accelerometers 202 and one or more y-axis accelerometers 504 may be first digitized in block 206 using analog-to-digital converters (ADCs) with a sampling rate f. Additionally, in block 206, calibration of coefficients may then be applied to transform the ADC counts into gravitational unit such that the maximum acceleration due to gravity is normalized to one, i.e., g=1. After applying calibration coefficients, sensor bias offset may also be corrected by block 206. The data is then low-pass filtered in block 208 in order to remove unwanted noise components. Let $\varphi = \Delta\alpha'$ be the instantaneous change in $\alpha'$. In block 210, an extended Kalman filter may then be applied to estimate g', $\varphi$, and r. The instantaneous centripetal acceleration, in terms of g is subsequently computed using:

$$\hat{\omega}(t) = f\hat{\varphi}(t) \quad (9)$$

$$\hat{a}_c(t) = \frac{\hat{r}\hat{\omega}^2(t)}{\kappa} \quad (10)$$

where $\hat{\varphi}$ is the estimated $\varphi$ and $\kappa \approx 9.8$ ms$^{-2}$ is the acceleration due to gravity at that point on earth. We may also obtain $$RPM = \frac{30\hat{\omega}}{\pi}.$$

Having obtained the centripetal acceleration, the X accelerometer data may be corrected as:

$$\hat{g}_X(t) = g_X'(t) + \hat{a}_c(t) \quad (11)$$

If required, it is also possible to estimate the tangential acceleration using $$\hat{a}_t(t) = \frac{\hat{r}\Delta\hat{\varphi}(t)f^2}{\kappa} \quad (12)$$

The estimated tangential acceleration may be subtracted from Y accelerometer data to give:

$$\hat{g}_Y(t) = g_Y'(t) - \hat{a}_t(t) \quad (13)$$

The magnitude of the inclination may be obtained from estimated g' as:

$$\hat{\theta}(t) = \left| \sin^{-1}\left(\frac{g'}{g}\right) \right| \quad (14)$$

In case of noisy data, an averaging filter may be used to smoothen $\hat{r}$. Similarly, an averaging/smoothening filter may be applied on $\hat{\theta}$ to remove noise effects.

The design details of the extended Kalman filter are given below.

State variables:

$$x_k = [\alpha', \varphi, \Delta\varphi, r, g']^T \quad (15)$$

Observations:

$$y_k = [g_X', g_Y']^T \quad (16)$$

State update equation $$x_{k+1} = \begin{bmatrix} 1 & 1 & 0 & 0 & 0 \\ 0 & 1 & 1 & 0 & 0 \\ 0 & 0 & 1 & 0 & 0 \\ 0 & 0 & 0 & 1 & 0 \\ 0 & 0 & 0 & 0 & 1 \end{bmatrix} x_k + w_k, \quad (17)$$

where $w_k$ is the process noise with covariance Q.

Output equation $$z_k = \begin{bmatrix} -g'\cos\alpha' - r\frac{(f\varphi)^2}{\kappa} \\ g'\sin\alpha' + r\frac{\Delta\varphi f^2}{\kappa} \end{bmatrix} + v_k, \text{ or} \quad (18)$$

$$z_k = \begin{bmatrix} -g'\cos\alpha' - r\frac{(f\varphi)^2}{\kappa} \\ g'\sin\alpha' \end{bmatrix} + v_k, \quad (19)$$

where $v_k$ is the measurement noise with covariance R.

In most cases, the radial offset does not change with time. Hence, it is sufficient to estimate r in block 212, referring back to FIG. 2, once using the above state model and subsequently use the estimated r for estimating the other stare variables. Consequently, the state variables and state transition matrix may be reduced to:

$$x_k = [\alpha', \varphi, \Delta\varphi, g']^T \text{ and} \quad (20)$$

$$F_k = \begin{bmatrix} 1 & 1 & 0 & 0 \\ 0 & 1 & 1 & 0 \\ 0 & 0 & 1 & 0 \\ 0 & 0 & 0 & 1 \end{bmatrix} \quad (21)$$

FIGS. 3-6 illustrate an example with noisy data and using the method above to remove noise from acceleromater data. As illustrated, RPM may be 200, a radial offset, r, of 5 mm, an inclination, θ, of 45 to 46 degrees (linearly increasing), and accelerometer data with a noise variance of 0.1 g, the systems and methods disclosed herein may estimate the RPM with an RMS error of 2.05, the radial offset with an error of +/−0.2 mm, and the inclination with an RMS error of 0.86 degrees. Filtering techniques may also be applied, as earlier noted, to reduce the noted errors in this example. It should be appreciated that the example described above is merely illustrative and that estimates and associated compensations may be performed for other values of the RPM, radial offset, and inclination (e.g., for an RPM of up to or more than 400).

In contrast with conventional algorithms that use a reference sensor such as gyroscope or use multiple sets of accelerometers which are radially aligned (collinear), the disclosed systems and methods do not require any reference data or knowledge of the accelerometer's position. With the help of a Kalman filter, the disclosed systems and methods blindly estimate an accelerometer's radial offset, and a toolface change from X and Y accelerometer data. Using these estimated parameters, referring back to FIG. 2, in block 214 the centripetal acceleration is subsequently computed followed by data correction. In addition to the aforementioned parameters, the disclosed systems and methods also estimate tangential acceleration due to rotation as well as inclination.

Figure 7:
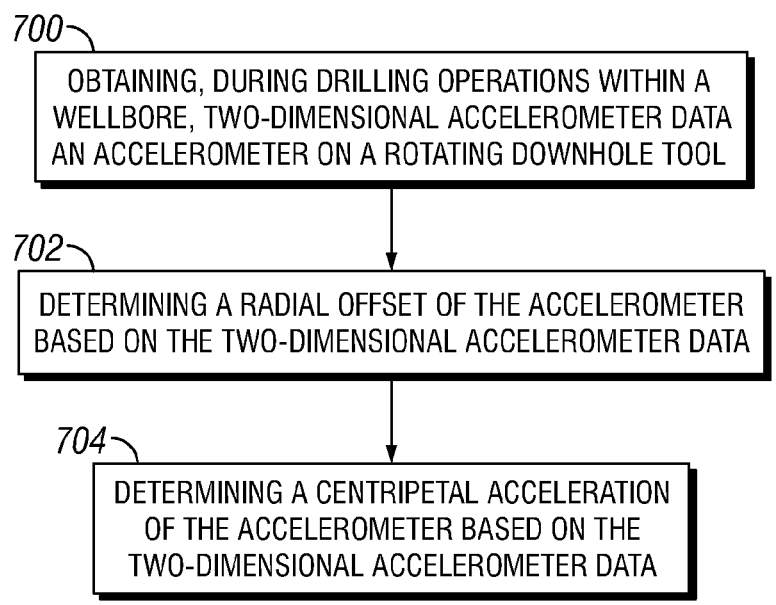
FIG. 7 is a flowchart of illustrative operations that may be performed for estimating a radial offset and centripetal acceleration of an accelerometer in a rotating downhole tool, in accordance with aspects of the subject disclosure.

FIG. 7 shows illustrative operations that may be performed (e.g., by measurement system 108) for radial offset and centripetal acceleration estimation and correction (e.g., while drilling). At block 700, two-dimensional accelerometer data may be obtained with an accelerometer 191 on a rotating downhole tool during drilling operations within a wellbore. At block 702, a radial offset of the accelerometer is determined based on the two-dimensional accelerometer data. At block 704, a centripetal acceleration of the accelerometer is determined based on the two-dimensional accelerometer data.

As discussed above, in accordance with various aspects of the disclosure, systems and methods may be provided for improving measurements of wellbore directional parameters by estimating radial offsets and centripetal acceleration of the accelerometer. Additionally, improving wellbore measurements may also estimating accelerometer bias.

For estimating accelerometer bias, in examples with no noise, only acceleration due to gravity acts on accelerometers when the downhole tool is not rotating. While rotating, a centripetal acceleration defined as $a_c(t)=r\omega^2(t)$ acts on an X-axis accelerometer and a tangential acceleration $$a_t(t) = r\frac{d\omega}{dt}$$

acts on a Y-axis accelerometer. For moderate RPM variations the tangential acceleration is negligible compared to the centripetal acceleration. Thus, inclination θ may be written as seen below, $$g_X(t)=-g'(t)\cos \alpha(t)-a_c(t) \quad (22)$$

$$g_Y(t)=g'(t)\sin \alpha(t)+a_t(t) \quad (23)$$

$$g_Z(t)=\cos \theta(t) \quad (24)$$

where $g_x$, $g_y$, and $g_z$ are the output of X, Y and Z accelerometers 191, respectively, $g'(t)=g \sin \theta(t)$, and α is the gravitational toolface.

MEMS inertial sensors suffer from bias error (offset). Taking bias into consideration, equation (22) may be modified as:

$$g_X(t)=-g'(t)\cos \alpha(t)-a_c(t)+b_X(t) \quad (25)$$

$$g_Y(t)=g'(t)\sin \alpha(t)+b_Y(t) \quad (26)$$

$$g_Z(t)=\cos \theta(t)+b_Z(t) \quad (27)$$

where $b_x$, $b_y$, and $b_z$ are the bias offsets corresponding to the X, Y and Z accelerometers, respectively. This bias error in the inertial data may be reflected in measurements. Hence, it is desirable to correct the bias error before computing the orientation parameters. Accelerometers may be calibrated to correct constant sensor bias errors and alleviate its effect in attitude measurements. However, since the physical properties of these sensors depend on various factors such as temperature, time, aging etc., the bias can greatly vary over time and between power cycles. For example, the bias may change with temperature.

Furthermore, MEMS-based inertial sensors may be susceptible to bias faults. Detection of such bias faults prevents measurement errors and hence saves time and cost.

In accordance with various aspects of the subject disclosure, systems and methods may be provided to estimate sensor bias from only accelerometer data. Fault diagnostic operations may be performed using the estimated bias value.

Sensor bias estimation may be performed for, for example, two reasons, namely, bias offset correction and sensor fault diagnostics. The systems and methods disclosed herein do not require any reference for estimating bias. The systems and methods disclosed herein apply an extended Kalman filter (EKF) to estimate the variables in equation (22) above using normalized accelerometer data. If the estimated bias is above or below certain thresholds, that measurement may be considered as faulty. In summary, the systems and methods disclosed herein estimate the bias offset of each accelerometer. The estimated bias may then be used for bias error correction as well as bias fault diagnosis.

Some bias estimation and fault diagnostic algorithms require references such as gyro or magnetometer data. It may be noted that commonly used MEMS-based gyroscopes are also susceptible to bias error. Magnetometers may not be reliable in the presence of external magnetic field disturbances. An erroneous reference may have a detrimental effect on bias correction. Unlike some existing techniques that employ a reference, the systems and methods described herein estimate bias directly from accelerometer data with the help of a Kalman filter.

In some systems, a constant bias correction is applied to accelerometers. This does not address dynamic components of sensor bias. In order to compensate for time-varying as well as temperature dependent component of bias, the bias may be estimated dynamically. Moreover, bias faults may be catastrophic while drilling downhole. Identification of such faults on time may save time and cost. The disclosed systems and methods dynamically estimate bias offsets of X, Y and Z accelerometers 191. Senor bias fault detection may be subsequently achieved by comparing the estimated bias with one or more thresholds. The disclosed systems and methods also estimate parameters such as inclination and angular velocity. From angular velocity, the disclosed systems and methods determine RPM and centripetal acceleration. In this way, the disclosed systems and methods provide biases, inclination, RPM, and centripetal acceleration.

Correcting accelerometer bias errors may increase the accuracy in estimating toolface, inclination and azimuth. This in turn helps to achieve better position control while drilling, thereby increasing drilling efficiency. Sensor bias fault detection helps not only to detect faulty measurements but also to carry out timely diagnosis and repair.

Figure 8:
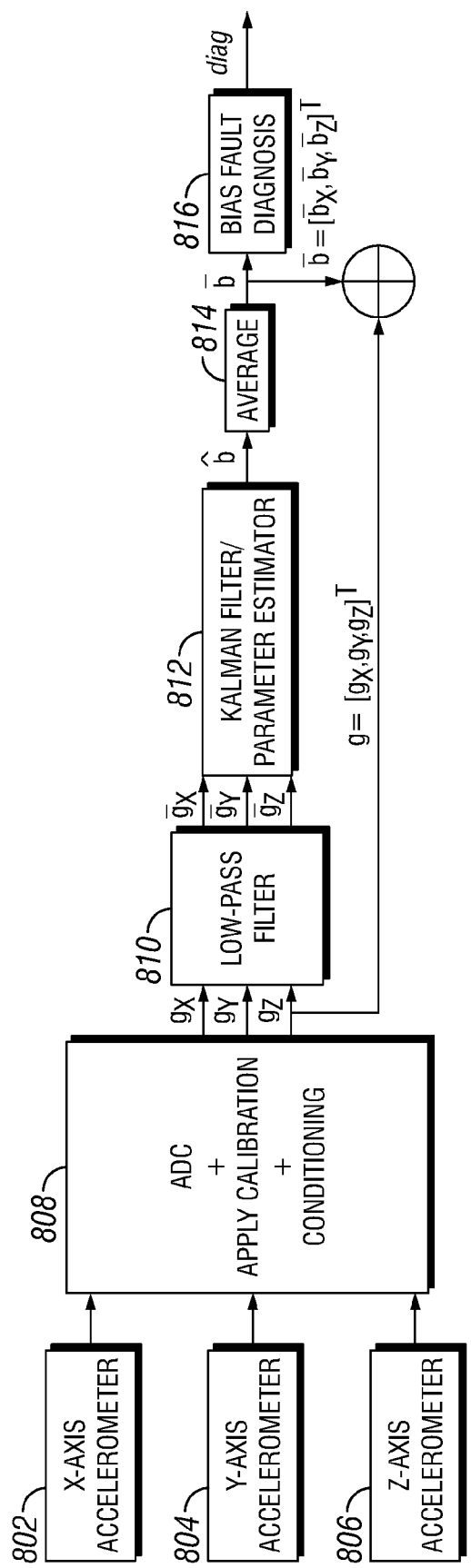
FIG. 8 is a block diagram illustrating a process that may be performed for estimating and correcting for accelerometer bias using accelerometer data, in accordance with aspects of the subject disclosure.

The block diagram shown in FIG. 8 illustrates the entire process. Raw analog signals from one or more x-axis accelerometers in block 802, one or more y-axis accelerometers in block 804, and one or more z-axis accelerometers in block 806 may be digitized in block 808 using analog-to-digital converters (ADCs) with a sampling rate f. Additionally in block 808, calibration coefficients may be applied to transform the ADC counts into gravitational units such that the maximum acceleration due to gravity is normalized to one. In block 810, the data is then low-pass filtered in order to remove unwanted noise components. In block 812, an extended Kalman filter is then applied to estimate the unknown bias. In block 814 an averaging filter may be used to smoothen the estimated bias. In block 816 the estimated bias values $\bar{b}=[\bar{b}_X, \bar{b}_Y, \bar{b}_Z]^T$ are then subtracted from the accelerometer data $g=[g_X, g_Y, g_Z]^T$ to obtain bias compensated $\hat{g}=[\hat{g}_X, \hat{g}_Y, \hat{g}_Z]^T$. In order to detect bias fault, the estimated bias values may be compared with threshold levels.

Various features of the extended Kalman filter are given below. It may be noted that, using the disclosed state model, the systems and methods disclosed herein can estimate, in addition to bias, other parameters like inclination, RPM, etc.

State variables:

$$x_k=[\alpha',\varphi,\Delta\varphi,b_X,b_Y,b_Z,\hat{\theta}]^T \quad (28)$$

In equation (28), α' is the total instantaneous angular displacement and c is the change in α', i.e., Δα'.

Observations:

$$y_k = [g_X, g_Y, g_Z]^T \quad (29)$$

State update equation:

$$x_{k+1} = \begin{bmatrix} 1 & 1 & 0 & 0 & 0 & 0 & 0 \\ 0 & 1 & 1 & 0 & 0 & 0 & 0 \\ 0 & 0 & 1 & 0 & 0 & 0 & 0 \\ 0 & 0 & 0 & 1 & 0 & 0 & 0 \\ 0 & 0 & 0 & 0 & 1 & 0 & 0 \\ 0 & 0 & 0 & 0 & 0 & 1 & 0 \\ 0 & 0 & 0 & 0 & 0 & 0 & 1 \end{bmatrix} x_k + w_k, \quad (30)$$

where $w_k$ is the process noise with covariance Q.

Output equation:

$$z_k = \begin{bmatrix} -\sin\hat{\theta}\cos\alpha' - r\frac{(f\varphi)^2}{\kappa} + b_X \\ \sin\hat{\theta}\sin\alpha' + r\frac{\Delta\varphi f^2}{\kappa} + b_Y \\ \cos\hat{\theta} + b_Z \end{bmatrix} + v_k, \quad (31)$$

where $v_k$ is the measurement noise with covariance R, r is the known radial offset of X accelerometer from the tool axis, and $\kappa \approx 9.8$ ms$^{-2}$ is the acceleration due to gravity on that point on earth. In the above formulation, $\hat{\theta}$ may assume $n\pi \pm \theta$, $n \in \mathbb{R}$, values. Hence, $\hat{\theta}$ may be initialized with a value belonging to the quadrant in which θ lies. For example, for $$0 \leq \theta \leq \frac{\pi}{2},$$

$\hat{\theta}$ may be initialized with $$\frac{\pi}{180}.$$

For $$\frac{\pi}{2} \leq \theta \leq \pi,$$

initializing $\hat{\theta}$ with $$\frac{\pi}{2}$$

may help the algorithm to converge to the required solution. Another option for initialization is to use inclination measured during static survey. The system may also estimate the centripetal acceleration acting on X accelerometer using:

$$\hat{\omega} = f\varphi \quad (32)$$

$$\hat{a}_c(t) = \frac{r\hat{\omega}^2}{\kappa} g, \quad (33)$$

where $\kappa \approx 9.8$ ms$^{-2}$ is the acceleration due to gravity on that point on earth.

Figure 9:
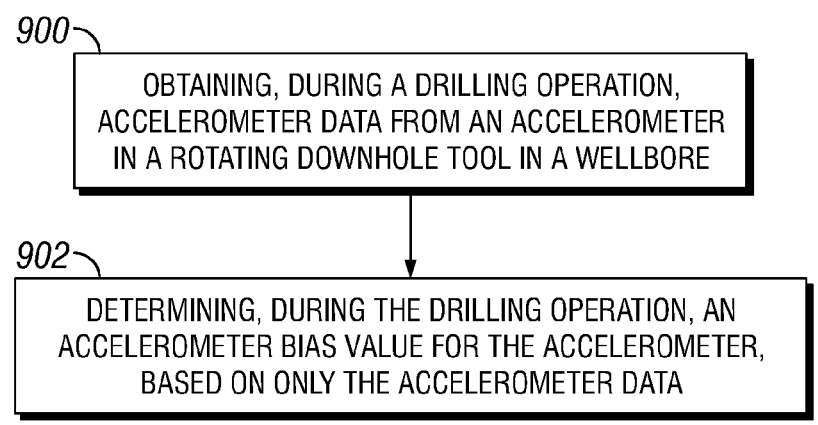
FIG. 9 is a flowchart of illustrative operations that may be performed for estimating and correcting for accelerometer bias using accelerometer data, in accordance with aspects of the subject disclosure.
Figure 10:
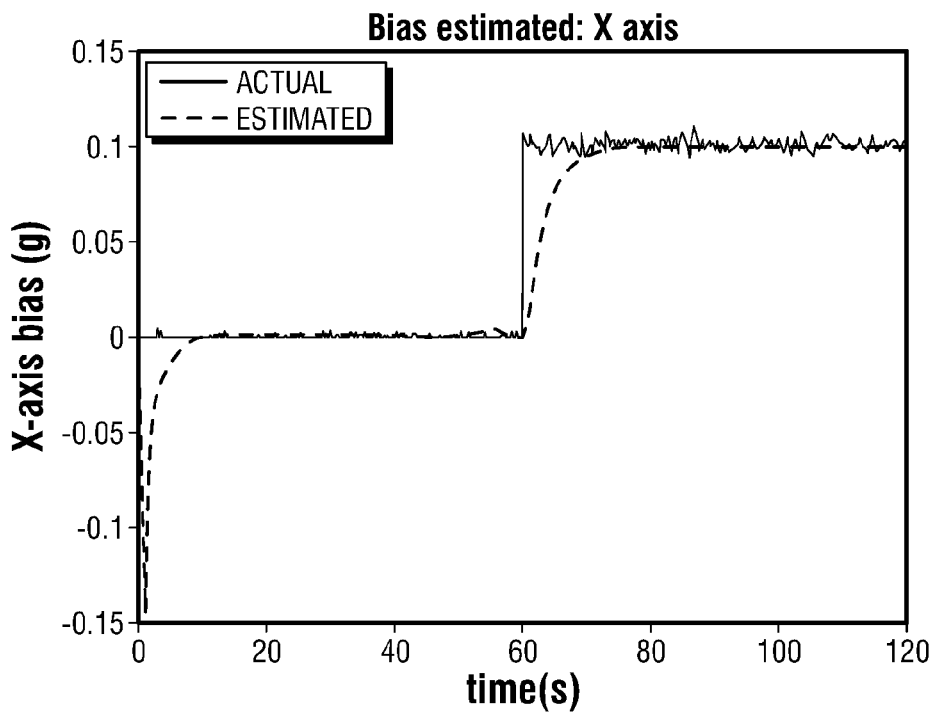
FIGS. 10-15 are graphs illustrating determining accelerometer bias.
Figure 11:
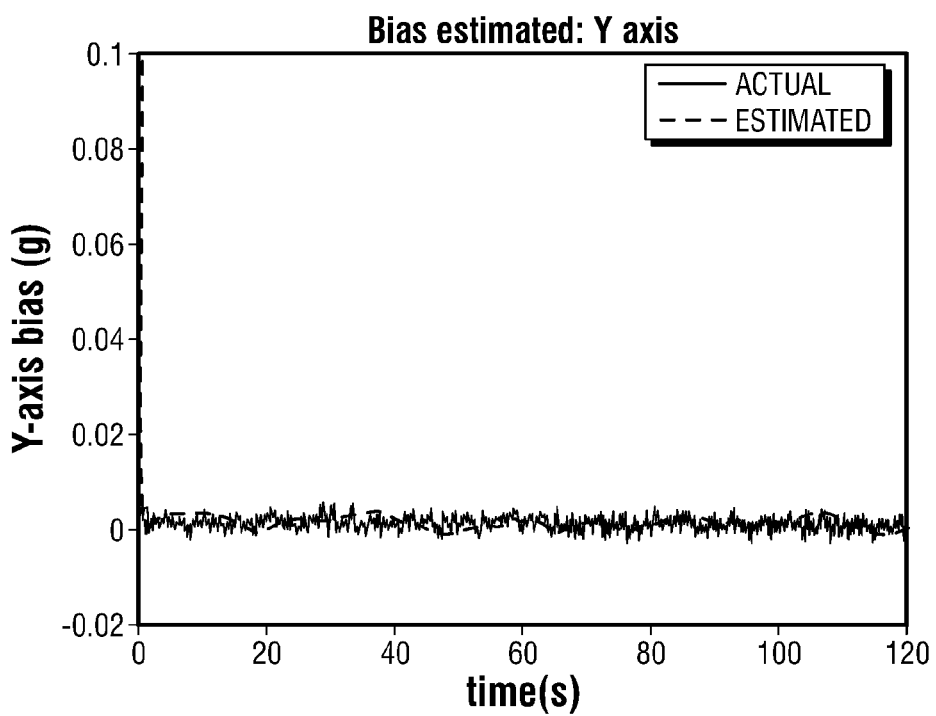
Figure 12:
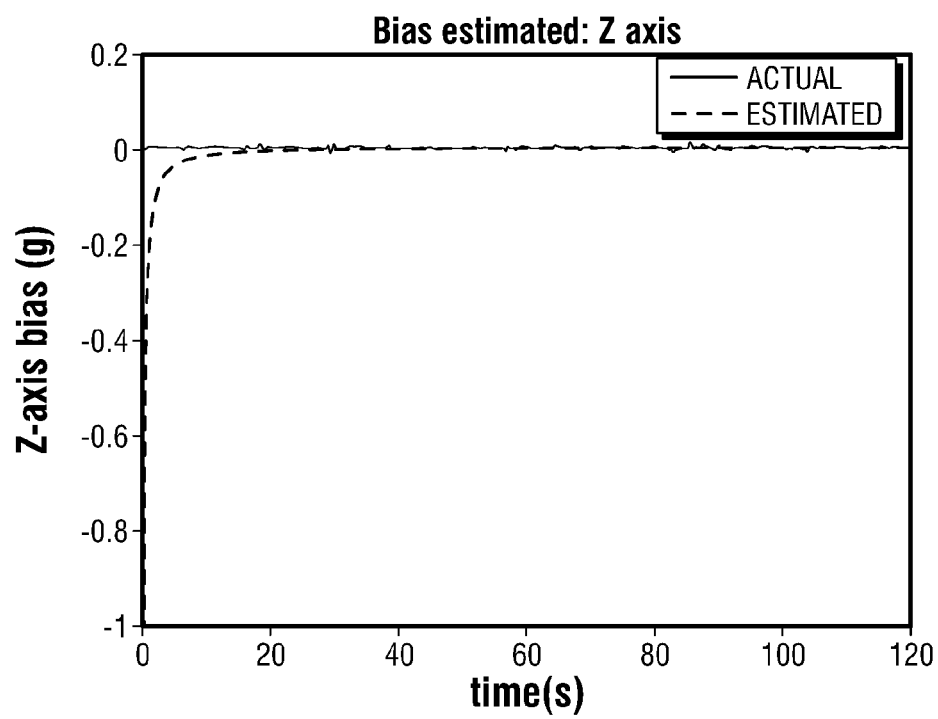
Figure 13:
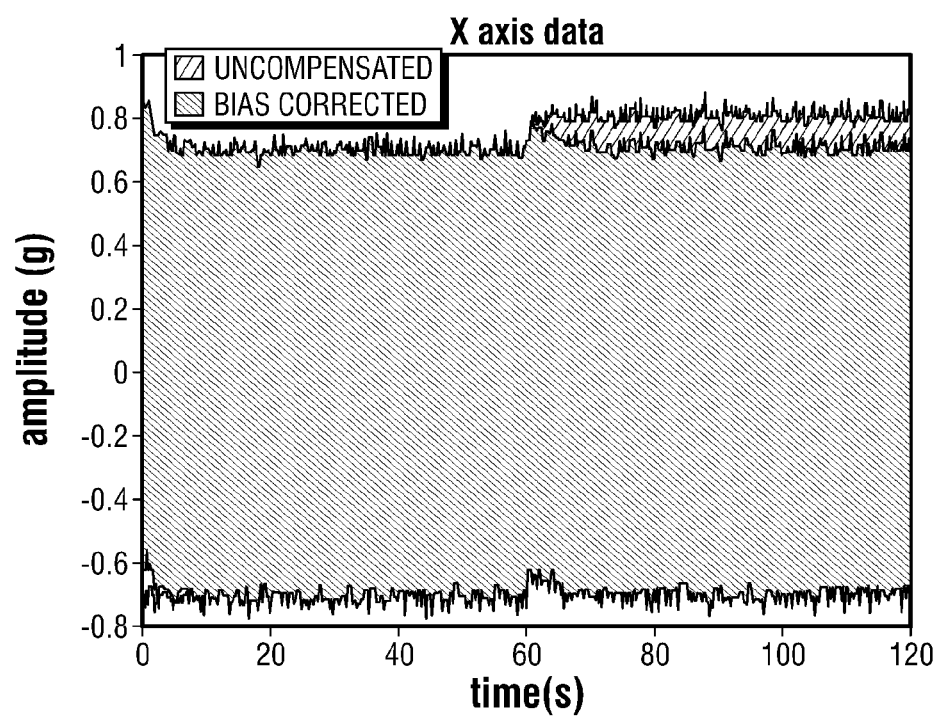
Figure 14:
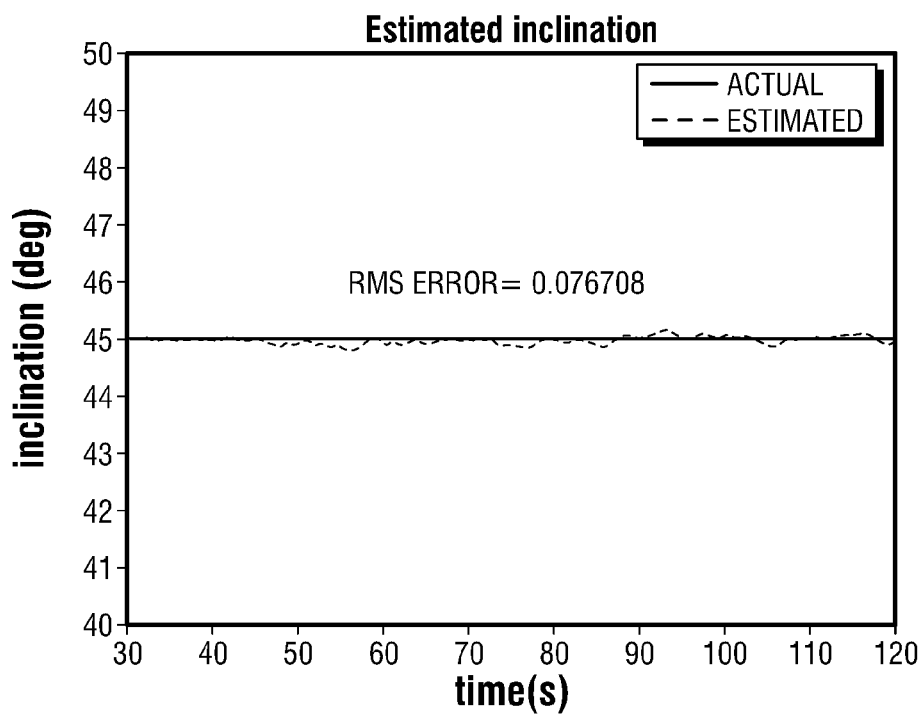
Figure 15:
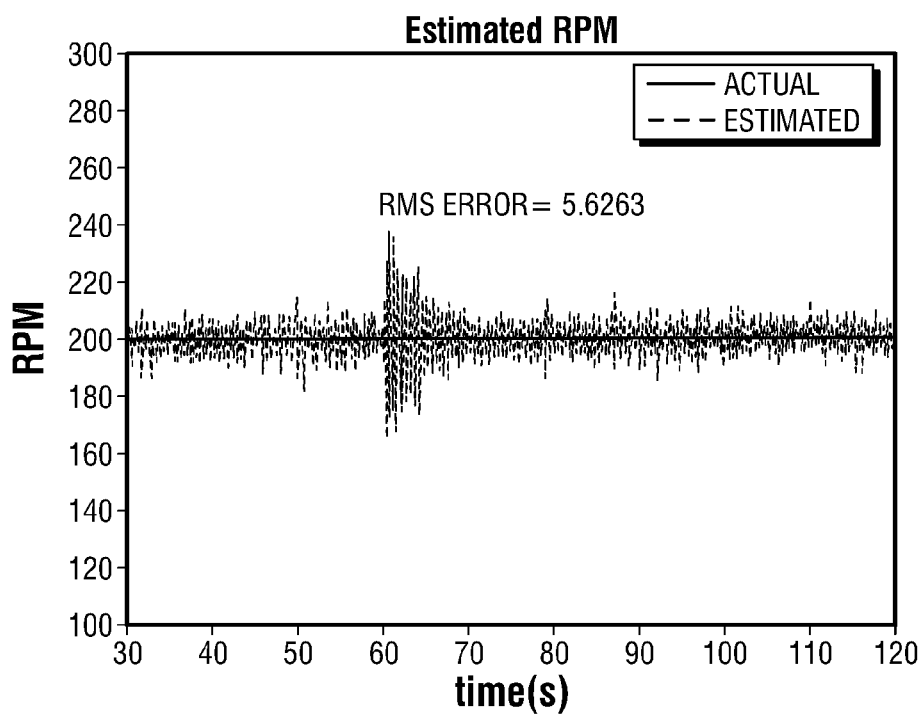

FIG. 9 shows illustrative operations that may be performed (e.g., by measurement system 108) for accelerometer bias estimation for an accelerometer 191 in a rotating downhole tool (e.g., while drilling). At block 900, accelerometer data is obtained from an accelerometer 191 in a rotating downhole tool in a wellbore during a drilling operation. At block 902, an accelerometer bias value for the accelerometer is determined, based on only the accelerometer data (e.g., without using additional reference data). Estimating the accelerometer bias value may include applying an extended Kalman filter (EKF) to estimate the variables in equation (33) above using normalized accelerometer data. An accelerometer bias fault diagnostic operation and/or a correction to the accelerometer data for the determined bias may also be performed using the estimated accelerometer bias value. The operations of blocks 900 and 902 may be performed for one or more (or each) accelerometer 191 in measurement tool 102.

FIGS. 10-15 illustrate determining accelerometer bias using methods described above. For examples, for an RPM of 200, a radial offset, r, of 0 mm, an inclination, θ, of 45 degrees, and using accelerometer data with a noise variance of 0.1 g, it has been seen that the systems and methods disclosed herein may measure Y-axis and/or Z-axis accelerometer bias. Subtracting the estimated bias from the accelerometer amplitude may provide an accurate corrected accelerometer measurement. With the noted correction, it has been seen that the systems and methods disclosed herein may estimate inclination with an RMS error of 0.07 degrees and may reduce the RMS error in RPM estimation from as large as 40 RPM to approximately 5.6 RPM.

In contrast with systems that use information such as angular velocity, attitude, magnetic toolface, etc. from other sensors or systems such as a gyroscope, magnetometers, a camera, a global positioning system (GPS) component, etc. in order to dynamically estimate accelerometer bias, the systems and methods disclosed herein determine accelerometer bias using only data from three accelerometers corresponding to X, Y and Z axes. In accordance with some aspects, the systems and methods disclosed herein use bias-corrected accelerometer data to determine parameters such as RPM, inclination, centripetal acceleration, etc., in addition to the determination of sensor bias.

This method and system may include any of the various features of the compositions, methods, and system disclosed herein, including one or more of the following statements.

Statement 1. A method may comprise obtaining, during drilling operations within a wellbore, two-dimensional accelerometer data with an accelerometer on a rotating downhole tool; determining a radial offset of the accelerometer based on the two-dimensional accelerometer data; and determining a centripetal acceleration of the accelerometer based on the two-dimensional accelerometer data.

Statement 2. The method of statement 1, further comprising performing a correction to at least some of the two-dimensional accelerometer data based on the determined centripetal acceleration.

Statement 3. The method of statement 2, wherein performing the correction comprises subtracting the determined centripetal acceleration from a one-dimensional component of the two-dimensional accelerometer data.

Statement 4. The method of statement 3, further comprising determining a gravitational acceleration component of the downhole tool based on the subtracted data.

Statement 5. The method of statement 4, further comprising estimating a toolface, an inclination, and an azimuth using the corrected data.

Statement 6. The method of statements 1 or 2, wherein the rotating downhole tool is a rotating directional drilling tool.

Statement 7. The method of statements 1, 2, or 6, wherein the accelerometer comprises first and second orthogonally aligned accelerometer sensors.

Statement 8. The method of statement 7, wherein the two-dimensional accelerometer data is only two-dimensional.

Statement 9. The method of statement 7, wherein the rotating downhole tool is free of any other accelerometers.

Statement 10. The method of statements 1, 2, or 7, wherein determining the radial offset comprises applying an extended Kalman filter to the two-dimensional accelerometer data.

Statement 11. The method of statement 10, wherein determining the centripetal acceleration comprises applying the extended Kalman filter to determine an instantaneous angular displacement of the accelerometer.

Statement 12. A method may comprise obtaining, during a drilling operation, accelerometer data from an accelerometer in a rotating downhole tool in a wellbore; and determining, during the drilling operation, an accelerometer bias value for the accelerometer, based on only the accelerometer data.

Statement 13. The method of statement 12, further comprising performing an accelerometer bias fault diagnostic operation using the estimated accelerometer bias value.

Statement 14. The method of statement 13, further comprising subtracting the accelerometer data form the estimated accelerometer bias value to obtain a bias compensated value.

Statement 15. The method of statements 12 or 13, further comprising converting an analog signal from the accelerometer to a digital signal and calibrating the digital signal with a computing subsystem.

Statement 16. The method of statement 15, further comprising filtering the digital signal with a low pass filter and applying a Kalman Filter to the digital signal.

Statement 17. A system may comprise one or more x-axis accelerometers disposed on a bottom hole assembly; one or more y-axis accelerometers disposed on the bottom hole assembly; an analog to digital converter, wherein the analog to digital converter converts an analog signal from the one or more x-axis accelerometers and the one or more y-axis accelerometers to a digital signal; and a computing subsystem configured to: calibrate the digital signal; filter the digital signal with a low pass filter; and apply a Kalman Filter to the digital signal.

Statement 18. The system of statement 17, wherein the computing subsystem is further configured to apply a centripetal acceleration estimator to the digital signal.

Statement 19. The system of statements 17 or 18, wherein the computing subsystem is further configured to apply a bias fault diagnosis to the digital signal.

Statement 20. The system of statements 17 to 19, further comprising one or more z-axis accelerometers disposed on the bottom hole assembly.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order.

It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Unless otherwise specified, terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A method, comprising:
    obtaining, during drilling operations within a wellbore, two-dimensional accelerometer data with an accelerometer on a rotating downhole tool;
    determining a radial offset of the accelerometer based on the two-dimensional accelerometer data; and
    determining a centripetal acceleration of the accelerometer based on the two-dimensional accelerometer data.

2. The method of claim 1, further comprising performing a correction to at least some of the two-dimensional accelerometer data based on the determined centripetal acceleration.

3. The method of claim 2, wherein performing the correction comprises subtracting the determined centripetal acceleration from a one-dimensional component of the two-dimensional accelerometer data.

4. The method of claim 3, further comprising determining a gravitational acceleration component of the downhole tool based on the subtracted data.

5. The method of claim 4, further comprising estimating a toolface, an inclination, and an azimuth using the corrected data.

6. The method of claim 1, wherein the rotating downhole tool is a rotating directional drilling tool.

7. The method of claim 1, wherein the accelerometer comprises first and second orthogonally aligned accelerometer sensors.

8. The method of claim 7, wherein the two-dimensional accelerometer data is only two-dimensional.

9. The method of claim 7, wherein the rotating downhole tool is free of any other accelerometers.

10. The method of claim 1, wherein determining the radial offset comprises applying an extended Kalman filter to the two-dimensional accelerometer data.

11. The method of claim 10, wherein determining the centripetal acceleration comprises applying the extended Kalman filter to determine an instantaneous angular displacement of the accelerometer.

12. A method, comprising:
    obtaining, during a drilling operation, accelerometer data from an accelerometer in a rotating downhole tool in a wellbore; and
    determining, during the drilling operation, an accelerometer bias value and a radial offset for the accelerometer, based on only the accelerometer data.

13. The method of claim 12, further comprising performing an accelerometer bias fault diagnostic operation using the estimated accelerometer bias value.

14. The method of claim 13, further comprising subtracting the accelerometer data form the estimated accelerometer bias value to obtain a bias compensated value.

15. The method of claim 12, further comprising converting an analog signal from the accelerometer to a digital signal and calibrating the digital signal with a computing subsystem.

16. The method of claim 15, further comprising filtering the digital signal with a low pass filter and applying a Kalman Filter to the digital signal.

17. A system, comprising:
    one or more x-axis accelerometers disposed on a bottom hole assembly;
    one or more y-axis accelerometers disposed on the bottom hole assembly;
    an analog to digital converter, wherein the analog to digital converter converts an analog signal from the one or more x-axis accelerometers and the one or more y-axis accelerometers to a digital signal; and
    a computing subsystem configured to:
        calibrate the digital signal;
        filter the digital signal with a low pass filter;
        apply a Kalman Filter to the digital signal; and
        determine a radial offset of the accelerometer based on the digital signal.

18. The system of claim 17, wherein the computing subsystem is further configured to apply a centripetal acceleration estimator to the digital signal.

19. The system of claim 17, wherein the computing subsystem is further configured to apply a bias fault diagnosis to the digital signal.

20. The system of claim 17, further comprising one or more z-axis accelerometers disposed on the bottom hole assembly.

* * * * *

UNITED STATES PATENT AND TRADEMARK OFFICE
CERTIFICATE OF CORRECTION

| | |
|---|---|
| PATENT NO. | : 11,255,179 B2 |
| APPLICATION NO. | : 16/651575 |
| DATED | : February 22, 2022 |
| INVENTOR(S) | : Rashobh Rajan Sobhana |

It is certified that error appears in the above-identified patent and that said Letters Patent is hereby corrected as shown below:

In the Specification

Column 3, Line 19 please remove "r and co" and replace with --r and $\omega$--;

Column 3, Line 53 please remove "r and co" and replace with --r and $\omega$--.

Signed and Sealed this
Third Day of May, 2022

Katherine Kelly Vidal
*Director of the United States Patent and Trademark Office*